US008773763B2

(12) United States Patent
Steenblik et al.

(10) Patent No.: US 8,773,763 B2
(45) Date of Patent: Jul. 8, 2014

(54) TAMPER INDICATING OPTICAL SECURITY DEVICE

(75) Inventors: Richard A. Steenblik, Alpharetta, GA (US); Mark J. Hurt, Duluth, GA (US); Gregory R. Jordan, Cumming, GA (US); Samuel M. Cape, Woodstock, GA (US)

(73) Assignee: Visual Physics, LLC, Alpharetta, GA (US)

( * ) Notice: Subject to any disclaimer, the term of this patent is extended or adjusted under 35 U.S.C. 154(b) by 660 days.

(21) Appl. No.: 12/855,309

(22) Filed: Aug. 12, 2010

(65) Prior Publication Data

US 2011/0019283 A1    Jan. 27, 2011

Related U.S. Application Data

(60) Continuation-in-part of application No. 11/771,623, filed on Jun. 29, 2007, now Pat. No. 8,120,855, and a continuation-in-part of application No. 11/932,468, filed on Oct. 31, 2007, now Pat. No. 8,111,462, which is a division of application No. 10/995,859, filed on Nov. 22, 2004, now Pat. No. 7,333,268.

(60) Provisional application No. 60/524,281, filed on Nov. 21, 2003, provisional application No. 60/538,392, filed on Jan. 22, 2004, provisional application No. 60/627,234, filed on Nov. 12, 2004, provisional application No. 61/233,264, filed on Aug. 12, 2009.

(51) Int. Cl.
*G02B 27/10* (2006.01)

(52) U.S. Cl.
USPC .......................................................... 359/619

(58) Field of Classification Search
USPC ................................................ 359/619–626
See application file for complete search history.

(56) References Cited

U.S. PATENT DOCUMENTS

| 992,151 A | 5/1911 | Berthon |
|---|---|---|
| 1,824,353 A | 9/1931 | Jensen |

(Continued)

FOREIGN PATENT DOCUMENTS

| AU | 2009278275 | 7/2012 |
|---|---|---|
| CN | 1126970 | 11/2003 |

(Continued)

OTHER PUBLICATIONS

Fletcher, D.A., et al., "Near-field infrared imaging with a microfabricated solid immersion lens", Applied Physics Letters, Oct. 2, 2000, pp. 2109-2111, vol. 77, No. 14.

(Continued)

*Primary Examiner* — Alicia M Harrington
(74) *Attorney, Agent, or Firm* — Holland & Bonzagni, P.C.; Mary R. Bonzagni, Esq.

(57) ABSTRACT

A tamper indicating optical security device that operates to produce one or more synthetic images is provided. Any attempt to detach (e.g., forcibly remove) this device from an underlying base material will cause one or more layers of the security device to separate or delaminate, rending the device partially or totally inoperable. The inventive device is contemplated for use with, among other things, currency or banknotes, secure documents such as bonds, checks, travelers checks, identification cards, lottery tickets, passports, postage stamps, and stock certificates, as well as non-secure documents such as stationery items and labels. The inventive device is also contemplated for use with consumer goods as well as bags or packaging used with consumer goods.

81 Claims, 7 Drawing Sheets

(56) References Cited

U.S. PATENT DOCUMENTS

| | | |
|---|---|---|
| 1,849,036 A | 3/1932 | Ernst |
| 1,942,841 A | 1/1934 | Shimizu |
| 2,268,351 A | 12/1941 | Tanaka |
| 2,432,896 A | 12/1947 | Hotchner |
| 2,888,855 A | 6/1959 | Tanaka |
| 2,992,103 A | 7/1961 | Land et al. |
| 3,122,853 A | 3/1964 | Koonz |
| 3,241,429 A | 3/1966 | Rice et al. |
| 3,264,164 A | 8/1966 | Jerothe |
| 3,312,006 A | 4/1967 | Rowland |
| 3,357,772 A | 12/1967 | Rowland |
| 3,463,581 A | 8/1969 | Clay |
| 3,609,035 A | 9/1971 | Ataka |
| 3,643,361 A | 2/1972 | Eaves |
| 3,704,068 A | 11/1972 | Waly |
| 3,811,213 A | 5/1974 | Eaves |
| 3,887,742 A | 6/1975 | Reinnagel |
| 4,025,673 A | 5/1977 | Reinnagel |
| 4,073,650 A | 2/1978 | Yevick |
| 4,082,426 A | 4/1978 | Brown |
| 4,185,191 A | 1/1980 | Stauffer |
| 4,345,833 A | 8/1982 | Siegmund |
| 4,417,784 A | 11/1983 | Knop et al. |
| 4,498,736 A | 2/1985 | Griffin |
| 4,507,349 A | 3/1985 | Fromson et al. |
| 4,534,398 A | 8/1985 | Crane |
| 4,634,220 A | 1/1987 | Hockert et al. |
| 4,645,301 A | 2/1987 | Orensteen et al. |
| 4,662,651 A | 5/1987 | Mowry, Jr. |
| 4,688,894 A | 8/1987 | Hockert |
| 4,691,993 A | 9/1987 | Porter et al. |
| 4,756,972 A | 7/1988 | Kloosterboer et al. |
| 4,765,656 A | 8/1988 | Becker et al. |
| 4,814,594 A | 3/1989 | Drexler |
| 4,892,336 A | 1/1990 | Kaule et al. |
| 4,892,385 A | 1/1990 | Webster, Jr. et al. |
| 4,920,039 A | 4/1990 | Fotland et al. |
| 4,935,335 A | 6/1990 | Fotland |
| 4,988,126 A | 1/1991 | Heckenkamp et al. |
| 5,074,649 A | 12/1991 | Hamanaka |
| 5,085,514 A | 2/1992 | Mallik et al. |
| 5,211,424 A | 5/1993 | Bliss |
| 5,215,864 A | 6/1993 | Laakmann |
| 5,232,764 A | 8/1993 | Oshima |
| 5,254,390 A | 10/1993 | Lu |
| 2,355,902 A | 8/1994 | Berg |
| 5,359,454 A | 10/1994 | Steenblik et al. |
| 5,384,861 A | 1/1995 | Mattson et al. |
| 5,393,099 A | 2/1995 | D'Amato |
| 5,433,807 A | 7/1995 | Heckenkamp et al. |
| 5,449,200 A | 9/1995 | Andric et al. |
| 5,461,495 A | 10/1995 | Steenblik et al. |
| 5,464,690 A | 11/1995 | Boswell |
| 5,468,540 A | 11/1995 | Lu |
| 5,479,507 A | 12/1995 | Anderson |
| 5,492,370 A | 2/1996 | Chatwin et al. |
| 5,555,476 A | 9/1996 | Suzuki et al. |
| 5,568,313 A | 10/1996 | Steenblik et al. |
| 5,575,507 A | 11/1996 | Yamauchi et al. |
| 5,598,281 A | 1/1997 | Zimmerman et al. |
| 5,623,347 A | 4/1997 | Pizzanelli |
| 5,623,368 A | 4/1997 | Calderini et al. |
| 5,626,969 A | 5/1997 | Joson |
| 5,631,039 A | 5/1997 | Knight et al. |
| 5,639,126 A | 6/1997 | Dames et al. |
| 5,642,226 A | 6/1997 | Rosenthal |
| 5,643,678 A | 7/1997 | Boswell |
| 5,670,003 A | 9/1997 | Boswell |
| 5,674,580 A | 10/1997 | Boswell |
| 5,688,587 A | 11/1997 | Burchard et al. |
| 5,695,346 A | 12/1997 | Sekiguchi et al. |
| 5,712,731 A | 1/1998 | Drinkwater et al. |
| 5,723,200 A | 3/1998 | Oshima |
| 5,737,126 A | 4/1998 | Lawandy |
| 5,753,349 A | 5/1998 | Boswell |
| 5,759,683 A | 6/1998 | Boswell |
| 5,783,017 A | 7/1998 | Boswell |
| 5,800,907 A | 9/1998 | Yumoto |
| 5,810,957 A | 9/1998 | Boswell |
| 5,812,313 A | 9/1998 | Johansen |
| 5,886,798 A | 3/1999 | Staub et al. |
| 5,933,276 A | 8/1999 | Magee |
| 5,995,638 A | 11/1999 | Amidror |
| 6,030,691 A | 2/2000 | Burchard et al. |
| 6,036,230 A | 3/2000 | Färber |
| 6,036,233 A | 3/2000 | Braun et al. |
| 6,060,143 A | 5/2000 | Tompkin |
| 6,084,713 A | 7/2000 | Rosenthal |
| 6,089,614 A | 7/2000 | Howland et al. |
| 6,106,950 A | 8/2000 | Searle et al. |
| 6,176,582 B1 | 1/2001 | Grasnick |
| 6,179,338 B1 | 1/2001 | Bergmann et al. |
| 6,195,150 B1 | 2/2001 | Silverbrook |
| 6,256,149 B1 | 7/2001 | Rolfe |
| 6,256,150 B1 | 7/2001 | Rosenthal |
| 6,283,509 B1 | 9/2001 | Braun et al. |
| 6,288,842 B1 | 9/2001 | Florczak et al. |
| 6,301,363 B1 | 10/2001 | Mowry, Jr. |
| 6,328,342 B1 | 12/2001 | Belousov et al. |
| 6,329,040 B1 | 12/2001 | Oshima et al. |
| 6,345,104 B1 | 2/2002 | Rhoads |
| 6,348,999 B1 | 2/2002 | Summersgill et al. |
| 6,350,036 B1 | 2/2002 | Hannington et al. |
| 6,369,947 B1 | 4/2002 | Staub et al. |
| 6,373,965 B1 | 4/2002 | Liang |
| 6,381,071 B1 | 4/2002 | Dona |
| 6,414,794 B1 | 7/2002 | Rosenthal |
| 6,424,467 B1 | 7/2002 | Goggins |
| 6,450,540 B1 | 9/2002 | Kim |
| 6,467,810 B2 | 10/2002 | Taylor et al. |
| 6,473,238 B1 | 10/2002 | Daniell |
| 6,500,526 B1 | 12/2002 | Hannington |
| 6,542,646 B1 | 4/2003 | Bar-Yona |
| 6,558,009 B2 | 5/2003 | Hannington et al. |
| 6,587,276 B2 | 7/2003 | Daniell |
| 6,616,803 B1 | 9/2003 | Isherwood et al. |
| 6,641,270 B2 | 11/2003 | Hannington et al. |
| 6,671,095 B2 | 12/2003 | Summersgill et al. |
| 6,712,399 B1 | 3/2004 | Drinkwater et al. |
| 6,721,101 B2 | 4/2004 | Daniell |
| 6,724,536 B2 | 4/2004 | Magee |
| 6,726,858 B2 | 4/2004 | Andrews |
| 6,751,024 B1 | 6/2004 | Rosenthal |
| 6,761,377 B2 | 7/2004 | Taylor et al. |
| 6,795,250 B2 | 9/2004 | Johnson et al. |
| 6,803,088 B2 | 10/2004 | Kaminsky et al. |
| 6,819,775 B2 | 11/2004 | Amidror et al. |
| 6,833,960 B1 | 12/2004 | Scarbrough et al. |
| 6,856,462 B1 | 2/2005 | Scarbrough et al. |
| 6,870,681 B1 | 3/2005 | Magee |
| 6,900,944 B2 | 5/2005 | Tomczyk |
| 6,935,756 B2 | 8/2005 | Sewall et al. |
| 7,030,997 B2 | 4/2006 | Neureuther et al. |
| 7,058,202 B2 | 6/2006 | Amidror |
| 7,068,434 B2 | 6/2006 | Florczak et al. |
| 7,114,750 B1 | 10/2006 | Alasia et al. |
| 7,194,105 B2 | 3/2007 | Hersch et al. |
| 7,246,824 B2 | 7/2007 | Hudson |
| 7,254,265 B2 | 8/2007 | Naske et al. |
| 7,255,911 B2 | 8/2007 | Lutz et al. |
| 7,288,320 B2 | 10/2007 | Steenblik et al. |
| 7,336,422 B2 | 2/2008 | Dunn et al. |
| 7,372,631 B2 | 5/2008 | Ozawa |
| 7,389,939 B2 * | 6/2008 | Jones et al. ............ 235/494 |
| 7,422,781 B2 | 9/2008 | Gosselin |
| 7,457,038 B2 | 11/2008 | Dolgoff |
| 7,457,039 B2 | 11/2008 | Raymond et al. |
| 7,504,147 B2 | 3/2009 | Hannington |
| 7,545,567 B2 | 6/2009 | Tomczyk |
| 7,630,954 B2 | 12/2009 | Adamczyk et al. |
| 7,686,187 B2 | 3/2010 | Pottish et al. |
| 7,712,623 B2 | 5/2010 | Wentz et al. |
| 7,763,179 B2 | 7/2010 | Levy et al. |
| 7,812,935 B2 | 10/2010 | Cowburn et al. |

(56) References Cited

U.S. PATENT DOCUMENTS

| | | |
|---|---|---|
| 7,849,993 B2 | 12/2010 | Finkenzeller et al. |
| 8,027,093 B2 | 9/2011 | Commander et al. |
| 8,057,980 B2 | 11/2011 | Dunn et al. |
| 8,149,511 B2 | 4/2012 | Kaule et al. |
| 2001/0048968 A1 | 12/2001 | Cox et al. |
| 2002/0014967 A1 | 2/2002 | Crane et al. |
| 2002/0185857 A1 | 12/2002 | Taylor et al. |
| 2003/0031861 A1 | 2/2003 | Reiter et al. |
| 2003/0112523 A1 | 6/2003 | Daniell |
| 2003/0179364 A1 | 9/2003 | Steenblik et al. |
| 2003/0183695 A1 | 10/2003 | Labrec et al. |
| 2003/0228014 A1 | 12/2003 | Alasia et al. |
| 2003/0232179 A1 | 12/2003 | Steenblik et al. |
| 2003/0234294 A1 | 12/2003 | Uchihiro et al. |
| 2004/0100707 A1 | 5/2004 | Kay et al. |
| 2004/0140665 A1 | 7/2004 | Scarbrough et al. |
| 2004/0209049 A1 | 10/2004 | Bak |
| 2005/0094274 A1 | 5/2005 | Souparis |
| 2005/0104364 A1 | 5/2005 | Keller et al. |
| 2005/0161501 A1 | 7/2005 | Giering et al. |
| 2005/0247794 A1* | 11/2005 | Jones et al. ............... 235/487 |
| 2006/0003295 A1 | 1/2006 | Hersch et al. |
| 2006/0017979 A1 | 1/2006 | Goggins |
| 2006/0018021 A1 | 1/2006 | Tomkins et al. |
| 2007/0058260 A1 | 3/2007 | Steenblik et al. |
| 2007/0092680 A1 | 4/2007 | Chaffins et al. |
| 2007/0183047 A1 | 8/2007 | Phillips et al. |
| 2007/0273143 A1 | 11/2007 | Crane et al. |
| 2007/0284546 A1 | 12/2007 | Ryzi et al. |
| 2007/0291362 A1 | 12/2007 | Hill et al. |
| 2008/0130018 A1 | 6/2008 | Steenblik et al. |
| 2008/0160226 A1 | 7/2008 | Kaule et al. |
| 2008/0182084 A1 | 7/2008 | Tompkin et al. |
| 2009/0034082 A1 | 2/2009 | Commander et al. |
| 2009/0315316 A1 | 12/2009 | Staub et al. |
| 2010/0018644 A1 | 1/2010 | Sacks et al. |
| 2010/0068459 A1 | 3/2010 | Wang et al. |
| 2010/0109317 A1 | 5/2010 | Huffmuller et al. |
| 2010/0177094 A1 | 7/2010 | Kaule et al. |
| 2010/0182221 A1 | 7/2010 | Kaule et al. |
| 2010/0194532 A1 | 8/2010 | Kaule |
| 2010/0208036 A1 | 8/2010 | Kaule |
| 2010/0328922 A1 | 12/2010 | Peters et al. |
| 2012/0019607 A1 | 1/2012 | Dunn et al. |
| 2012/0033305 A1 | 2/2012 | Moon et al. |
| 2013/0010048 A1 | 1/2013 | Dunn et al. |

FOREIGN PATENT DOCUMENTS

| | | |
|---|---|---|
| DE | 19804858 | 8/1999 |
| DE | 19932240 | 1/2001 |
| EP | 0090130 | 10/1983 |
| EP | 0092691 | 11/1983 |
| EP | 0118222 | 9/1984 |
| EP | 0203752 | 12/1986 |
| EP | 0253089 | 1/1988 |
| EP | 0318717 | 6/1989 |
| EP | 0415230 | 3/1991 |
| EP | 0319157 | 7/1992 |
| EP | 0930174 | 7/1999 |
| EP | 0997750 | 5/2000 |
| EP | 1356952 | 10/2003 |
| EP | 1659449 | 5/2006 |
| EP | 1876028 | 1/2008 |
| EP | 2335937 | 6/2011 |
| EP | 2162294 | 3/2012 |
| FR | 2803939 | 7/2001 |
| GB | 1095286 | 12/1967 |
| GB | 2362493 | 11/2001 |
| JP | 41-004953 | 3/1966 |
| JP | 46-022600 | 8/1971 |
| JP | H04234699 | 8/1992 |
| JP | 11-501590 | 2/1999 |
| JP | 11189000 | 7/1999 |
| JP | 2000-256994 | 9/2000 |
| JP | 2001-055000 | 2/2001 |
| JP | 2001-324949 | 11/2001 |
| JP | 2003039583 | 2/2003 |
| JP | 2003-165289 | 6/2003 |
| JP | 2003-528349 | 9/2003 |
| JP | 2004-262144 | 9/2004 |
| KR | 10-0194536 | 6/1999 |
| RU | 2111125 | 5/1998 |
| RU | 2245566 | 1/2005 |
| TW | 575740 | 2/2004 |
| WO | WO 96/35971 | 11/1996 |
| WO | WO 97/19820 | 6/1997 |
| WO | 97/44769 | 11/1997 |
| WO | WO 98/13211 | 4/1998 |
| WO | WO 98/15418 | 4/1998 |
| WO | WO 98/26373 | 6/1998 |
| WO | 99/26793 | 6/1999 |
| WO | WO 99/66356 | 12/1999 |
| WO | 01/11591 | 2/2001 |
| WO | WO 01/07268 | 2/2001 |
| WO | 01/39138 | 5/2001 |
| WO | WO 01/63341 | 8/2001 |
| WO | WO 01/71410 | 9/2001 |
| WO | WO 02/40291 | 5/2002 |
| WO | WO 02/43012 | 5/2002 |
| WO | 03/005075 | 1/2003 |
| WO | 03/007276 | 1/2003 |
| WO | WO 03/022598 | 3/2003 |
| WO | WO 03/053713 | 7/2003 |
| WO | WO 03/061980 | 7/2003 |
| WO | WO 03/061983 | 7/2003 |
| WO | WO 03/082598 | 10/2003 |
| WO | WO 03/098188 | 11/2003 |
| WO | WO 2004/022355 | 3/2004 |
| WO | 2004/036507 | 4/2004 |
| WO | 2004/087430 | 10/2004 |
| WO | WO 2005/106601 | 11/2005 |
| WO | 2007/076952 | 7/2007 |
| WO | 2009/000527 | 12/2008 |
| WO | 2009/000528 | 12/2008 |
| WO | 2009/000529 | 12/2008 |
| WO | 2009/000530 | 12/2008 |
| WO | WO 2009/121784 | 10/2009 |
| WO | 2010/015383 | 2/2010 |

OTHER PUBLICATIONS

Hutley, M.C., et al., "The Moiré Magnifier", Pure Appl. Opt. 3, 1994, pp. 133-142, IOP Publishing Ltd., UK.

Hutley, M.C., "Integral Photography, Superlenses and the Moiré Magnifier", European Optical Society, 1993, pp. 72-75, vol. 2, UK.

Hutley, M., et al., "Microlens Arrays", Physics World, Jul. 1991, pp. 27-32.

Kamal, H., et al., "Properties of Moiré Magnifiers", Opt. Eng., Nov. 1998, pp. 3007-3014, vol. 37, No. 11.

Lippmann, G., "Photgraphie—Épreuves Réeversibles, Photographies Intégrals", Académie des Sciences, 1908, pp. 446-451, vol. 146, Paris.

Liu, S., et al., "Artistic Effects and Application of Moiré Patterns in Security Holograms", Applied Optics, Aug. 1995, pp. 4700-4702, vol. 34, No. 22.

Zhang, X., et al., "Concealed Holographic Coding for Security Applications by Using a Moiré Technique", Applied Optics, Nov. 1997, pp. 8096-8097, vol. 36, No. 31.

Gale, M. T., et al., Chapter 6—Replication, Micro Optics: Elements, Systems and Applications, 1997, pp. 153-177.

Leech, Patrick W., et al., Printing via hot embossing of optically variable images in thermoplastic acrylic lacquer, Microelectronic Engineering, 2006, pp. 1961-1965, vol. 83, No. 10, Elsevier Publishers BV, Amsterdam, NL.

Phillips, Roger W., et al., Security Enhancement of Holograms with Interference Coatings, Optical Security and Counterfeit Deterrence Techniques III, 2000, pp. 304-316, SPIE vol. 3973, San Jose, CA.

Steenblik, Richard A., et al., UNISON Micro-optic Security Film, Optical Security and Counterfeit Deterrence Techniques V, 2004, pp. 321-327, SPIE vol. 5310, San Jose, CA.

(56) References Cited

OTHER PUBLICATIONS

Van Renesse, Rudolf L., Optical Document Security, 1994, Artech House Inc., Norwood, MA.

Wolpert, Gary R., Design and development of an effective optical variable device based security system incorporating additional synergistic security technologies, Optical Security and Counterfeit Deterrence Techniques III, 2000, pp. 55-61, SPIE vol. 3973, San Jose, CA.

Extended European Search Report dated Jan. 11, 2012 for European Divisional Patent Publication No. 2335944 (04120P-EPDIV7).

Drinkwater, K. John, et al., "Development and applications of Diffractive Optical Security Devices for Banknotes and High Value Documents", Optical Security and Counterfeit Deterrence Techniques III, 2000, pp. 66-79, SPIE vol. 3973, San Jose, CA.

Hardwick, Bruce and Ghioghiu Ana, "Guardian Substrate As An Optical Medium For Security Devices", Optical Security and Counterfeit Deterrence Techniques III, 2000, pp. 176-179, SPIE vol. 3973, San Jose, CA.

Van Renesse, Rudolf L., Optical Document Security, 1998, 2nd edition, pp. 232-235, 240-241 and 320-321, Artech House Inc., Norwood, MA (ISBN 0-89006-982-4).

Van Renesse, Rudolf L., Optical Document Security, 2005, 3rd edition, pp. 62-169, Artech House Inc., Norwood, MA (ISBN 1-58053-258-6).

* cited by examiner

TAMPER INDICATING OPTICAL SECURITY DEVICE

RELATED APPLICATIONS

This application is a continuation-in-part of U.S. patent application Ser. No. 11/771,623, filed Jun. 29, 2007 (now U.S. Pat. No. 8,120,855), and of U.S. patent application Ser. No. 11/932,468, filed Oct. 31, 2007 (now U.S. Pat. No. 8,111,462), both of which are divisionals of and claim priority to U.S. patent application Ser. No. 10/995,859, filed Nov. 22, 2004 (now U.S. Pat. No. 7,333,268), which claims priority to U.S. Provisional Patent Application Ser. No. 60/524,281, filed Nov. 21, 2003, U.S. Provisional Patent Application Ser. No. 60/538,392, filed Jan. 22, 2004, and U.S. Provisional Patent Application Ser. No. 60/627,234, filed Nov. 12, 2004, all of which are hereby incorporated herein by reference in their entirety, and this application claims benefit of and priority to U.S. Provisional Patent Application Ser. No. 61/233,264, filed Aug. 12, 2009, which is incorporated herein by reference in its entirety.

TECHNICAL FIELD

The present invention generally relates to a tamper indicating optical security device that operates to produce one or more synthetic images, wherein any attempt to detach this device from an underlying base material will render the device either fully or partially inoperable.

BACKGROUND AND SUMMARY OF THE INVENTION

Micro-optic film materials for projecting synthetic images generally comprise (a) a light-transmitting polymeric substrate, (b) an arrangement of micro-sized image icons located on or within the polymeric substrate, and (c) an arrangement of focusing elements (e.g., microlenses). The image icon and focusing element arrangements are configured such that when the arrangement of image icons is viewed through the arrangement of focusing elements, one or more synthetic images are projected. These projected images may show a number of different optical effects. Material constructions capable of presenting such effects are described in U.S. Pat. No. 7,333,268 to Steenblik et al., U.S. Pat. No. 7,468,842 to Steenblik et al., U.S. Pat. No. 7,738,175 to Steenblik et al., U.S. Patent Application Publication No. 2009/0034082 to Commander et al., U.S. Patent Application Publication No. 2009/0008923 to Kaule et al.; U.S. Patent Application Publication No. 2010/0177094 to Kaule et al.; U.S. Patent Application Publication No. 2010/0182221 to Kaule et al.; European Patent Application No. 08784548.3 to Kaule et al.; and European Patent Application No. 08759342.2 to Kaule.

These film materials may be used as security devices for authentication of banknotes, secure documents and products. For banknotes and secure documents, these materials are typically used in the form of a strip or thread and either partially embedded within the banknote or document, or applied to a surface thereof. For passports or other identification (ID) documents, these materials could be used as a full laminate.

While such devices have been used in the past, they have not had, for example, a "peel to destroy" tamper indicating property. By tampering is meant unauthorized interference with the device (i.e., attempts to remove the device from an object) whether for the purposes of counterfeiting, forgery or substitution.

The present invention therefore provides a tamper indicating security device that operates to produce one or more synthetic images, the device being adhered or bonded to a base material (e.g., passport paper), wherein the device separates or delaminates when an attempt is made to detach the device from the base material, rendering the device either fully or partially inoperable. The phrase "fully or partially inoperable", as used herein, is intended to mean that the inventive device would either (a) no longer be capable of producing one or more synthetic images (fully inoperable), or (b) only be capable of producing a reduced number of synthetic images (partially inoperable).

The tamper indicating security device of the present invention is changed irreversibly when removal of the device from an object is attempted. The device, therefore, cannot be removed and re-adhered to another object, such as a counterfeit object, without the replacement being detected.

The inventive device may be adhered or bonded to an underlying base material with or without the use of an adhesive. By way of example, bonding may be achieved using ultrasonic welding, vibration welding, and laser fusing of the device directly to the base material.

The tamper indicating security device of the present invention comprises an optical film material that is made up of at least one layer containing focusing elements (e.g., lenses), at least one layer containing image elements (e.g., icons), and at least one optical spacer or spacer layer positioned between the focusing element layer(s) and the image element layer(s), with the focusing elements forming one or more synthetic images of at least a portion of the image elements. The optical film material may optionally further comprise one or more layers selected from the group of bond weakening layers, primer or adhesive layers, and combinations thereof. Moreover, the focusing element layer(s) may optionally constitute a partially or fully embedded layer, as will be described in more detail below.

The inventive security device may optionally further comprise one or more layers applied to one or opposing sides of the device, those layers including, but not limited to, print layers (e.g., back side print layers), metalized and/or partially demetalized layers, primer or adhesive layers, sealing or coating layers, stiffening layers, and combinations thereof.

When the inventive device is adhered or bonded to a base material and an attempt is made to separate the device from the base material, the device is designed to fail, with failure generally occurring internally within and/or between the focusing element layer(s) and the image element layer(s).

Separation attempts can range from trying to pull the device from the base material, to trying to slide a sharp object, such as a razor blade, between the film material and the base material, to chemical, thermal, cryogenic, or mechanical shock.

In one contemplated embodiment, the optical film material further comprises an optical spacer or spacer layer. More specifically, the tamper indicating security device of this contemplated embodiment comprises:

(a) an optical film material comprising at least one layer containing focusing elements, at least one layer containing image elements, and an optical spacer or spacer layer positioned between and adhered to the at least one focusing element layer and the at least one image element layer, with the focusing elements forming one or more synthetic images of at least a portion of the image elements; and (b) optionally, one or more layers selected from the group of print layers, metalized and/or partially demetalized layers, primer or adhesive layers, sealing or coating layers, stiffening layers, and combinations thereof.

The tamper indicating security device of this contemplated embodiment may be designed for intralayer failure at any layer, or interlayer failure at any interface between the focusing element layer(s) and the image element layer(s) such as between the focusing element layer(s) and the optical spacer, or between the optical spacer and the image element layer(s) of the optical film material. In particular, when the device is adhered to a base material and an attempt is made to separate the device from the base material, the stress inherent in such an attempt will be concentrated at an interface of one set of these named layers.

In another contemplated embodiment, two optical spacer or spacer layers and a primer or adhesive layer are used in the optical film material. More specifically, the tamper indicating security device of this contemplated embodiment comprises:

(a) an optical film material comprising at least one layer containing focusing elements, at least one layer containing image elements, two optical spacer or spacer layers adhered together by a primer or adhesive layer, the two optical spacer or spacer layers positioned between and adhered to the at least one focusing element layer and the at least one image element layer, with the focusing elements forming one or more synthetic images of at least a portion of the image elements; and (b) optionally, one or more layers selected from the group of print layers, metalized and/or partially demetalized layers, primer or adhesive layers, sealing or coating layers, stiffening layers, and combinations thereof.

The tamper indicating security device of this contemplated embodiment may be designed for interlayer failure between one of the optical spacer or spacer layers and the primer or adhesive layer of the optical film material.

In yet another contemplated embodiment, a bond weakening layer is introduced into the optical film material, with failure designed to occur within this layer and/or between this layer and one or more adjacent or contiguous layers.

In yet a further contemplated embodiment, the focusing elements are reflective focusing elements or focusing reflectors, where interlayer failure may be designed to occur between, for example, a reflective (e.g., metal) layer applied to a surface of the focusing reflectors and the focusing reflectors, or between the optical spacer and the focusing reflectors.

To achieve the described intralayer and/or interlayer failure the inventive security device is designed such that:

(a) the cohesive strength of a target layer in the security device is less than the cohesive strength of the other layers in the security device; and/or (b) the bond strength of a target interface between two layers in the security device is less than the bond strength(s) of the interface(s) between other layers in the security device and between the security device and the base material.

As will be described in more detail below, the inventive security device may be designed to incorporate these relative cohesive and/or bond strengths, which contribute to intralayer failure and/or interlayer failure or delamination at a target layer or at a target interface between the focusing element layer(s) and the image element layer(s), by:

(1) increasing or decreasing the stiffness (Young's modulus or tensile modulus), bond strength, or crosslink density of one or more target layers or interfaces relative to the remaining layers or interfaces of the security device;

(2) incorporating stress inducing (e.g., volume changing) components into one or more target layers of the security device; and/or (3) introducing a bond weakening layer at a target interface between two layers of the security device.

Other features and advantages of the invention will be apparent to one of ordinary skill from the following detailed description and accompanying drawings. Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

The present disclosure may be better understood with reference to the following drawings. Matching reference numerals designate corresponding parts throughout the drawings, and components in the drawings are not necessarily to scale, emphasis instead being placed upon clearly illustrating the principles of the present disclosure. While exemplary embodiments are disclosed in connection with the drawings, there is no intent to limit the present disclosure to the embodiment or embodiments disclosed herein. On the contrary, the intent is to cover all alternatives, modifications and equivalents.

Particular features of the disclosed invention are illustrated by reference to the accompanying drawings in which:

FIG. 2B shows interlayer failure between the focusing element layer and optical spacer of the tamper indicating security device of FIG. 2A, while

FIG. 3B shows interlayer failure between the focusing element layer and optical spacer of the tamper indicating security device of FIG. 3A, while

FIG. 4B shows interlayer failure between the focusing element layer and optical spacer of the tamper indicating security device of FIG. 4A, while

DETAILED DESCRIPTION OF THE INVENTION

The present inventors, recognizing the usefulness of a "peel to destroy" feature, have developed a tamper indicating security device designed for intralayer and/or interlayer failure when an attempt is made to separate the device from an underlying base material.

The inventive device, which can take the form of, for example, a security strip, thread, patch, inlay, or overlay, is contemplated for use with, among other things, currency or banknotes, secure documents such as bonds, checks, travelers checks, identification cards, lottery tickets, passports, postage stamps, and stock certificates, as well as non-secure documents such as stationery items and labels. The inventive device is also contemplated for use with consumer goods as well as bags or packaging used with consumer goods.

Figure 1A:
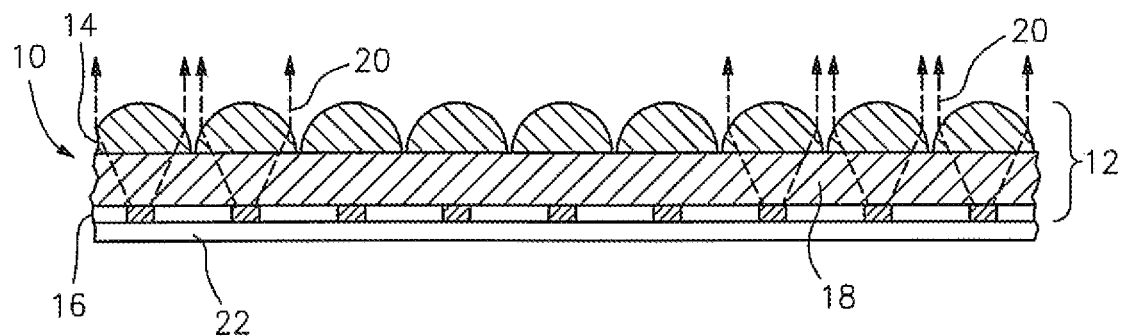
FIG. 1A is a cross-sectional side view of one embodiment of the tamper indicating security device of the present invention, where the optical film material comprises one focusing element layer, one icon layer, and an optical spacer positioned between and adhered to these layers, the film material being adhered or bonded directly to a base material without using an adhesive.
Figure 1B:
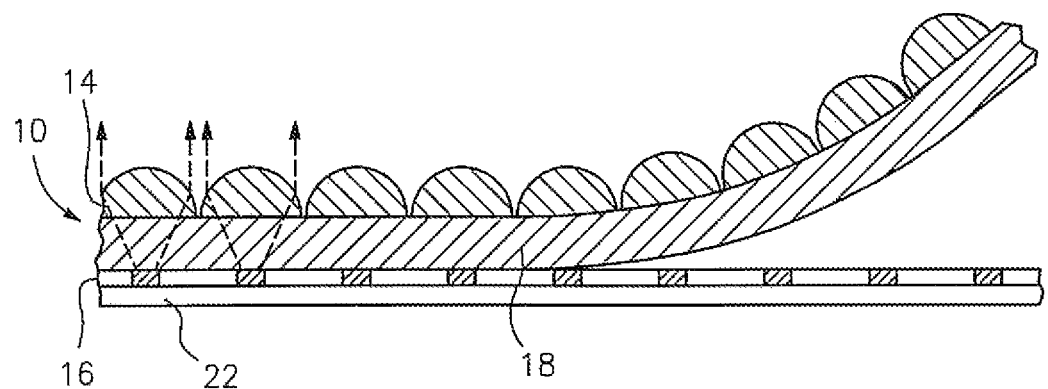
FIG. 1B shows interlayer failure between the optical spacer and the icon layer of the tamper indicating security device shown in FIG. 1A, as an attempt is made to detach the device from the base material.

Referring now to FIG. 1A of the drawings, an exemplary embodiment of the tamper indicating optical security device of the present invention is shown generally at 10. Device 10 basically comprises: a optical film material 12 made up of a layer containing focusing elements 14, a layer containing icons 16, and an optical spacer 18, which is positioned between and adhered to the focusing element layer 14 and the icon layer 16, the focusing elements forming at least one synthetic image 20 of at least a portion of the icons. When two different synthetic images are formed by the focusing elements, one synthetic image may operate to modulate or control the extent of the appearance of another synthetic image, as described in U.S. Pat. No. 7,738,175, which is incorporated herein by reference in its entirety. In the exemplary embodiment shown in FIG. 1A, the inventive tamper indicating optical security device 10 is shown directly adhered to base material 22 by, for example, using heat to seal or fuse the materials together, using pressure sensitive adhesive materials, or forming interlocking microstructures.

Figure 2A:
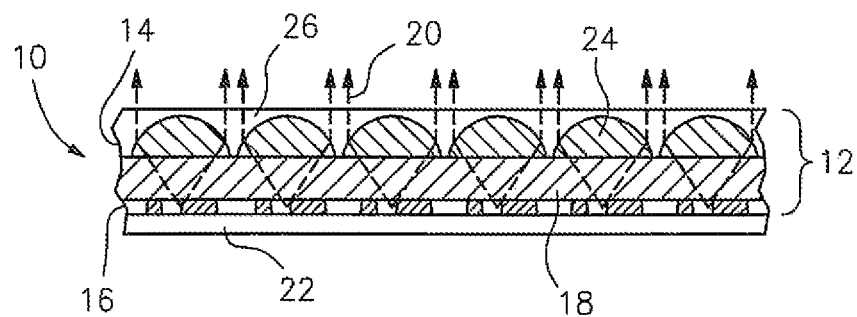
FIG. 2A is similar to FIG. 1A except that the focusing element layer is an embedded layer of convex lenses.
Figure 3A:
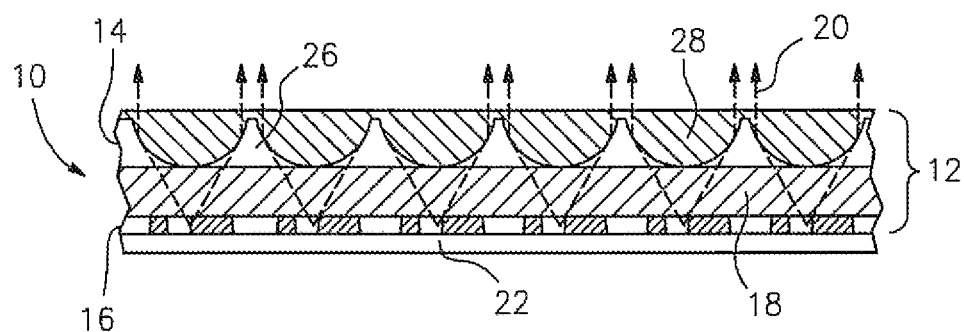
FIG. 3A is also similar to FIG. 1A except that the focusing element layer is an embedded layer of concave lenses.
Figure 4A:
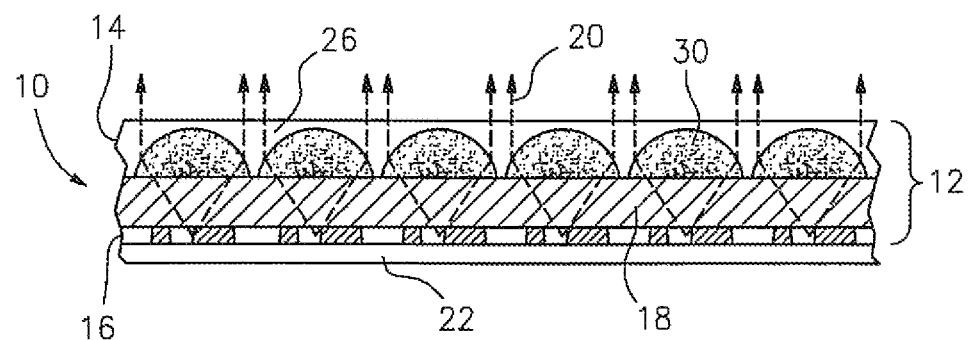
FIG. 4A is also similar to FIG. 1A except that the focusing element layer is an embedded layer of convex gradient-index (GRIN) lenses.

FIGS. 2A, 3A, 4A depict embodiments similar to the embodiment shown in FIG. 1A, with the exception that: the focusing element layer 14 is an embedded layer of convex lenses 24 in FIG. 2A, with reference numeral 26 used to designate the embedding material; the focusing element layer 14 is an embedded layer of concave lenses 28 in FIG. 3A; and the focusing element layer 14 is an embedded layer of convex gradient-index (GRIN) lenses 30 in FIG. 4A.

Figure 5A:
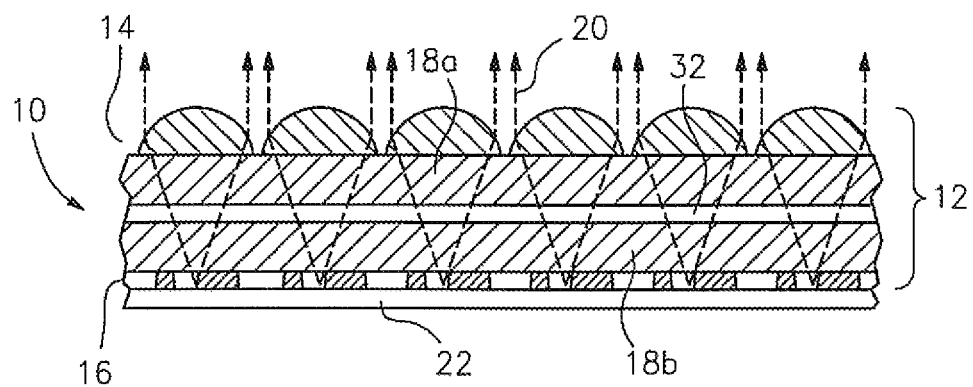
FIG. 5A is a cross-sectional side view of yet another embodiment of the tamper indicating security device of the present invention, where the optical film material comprises one focusing element layer, one icon layer, and two optical spacers adhered together by a primer or adhesive layer, the two optical spacers positioned between and adhered to the focusing element layer and the icon layer, the film material being adhered or bonded directly to a base material without using an adhesive.
Figure 6A:
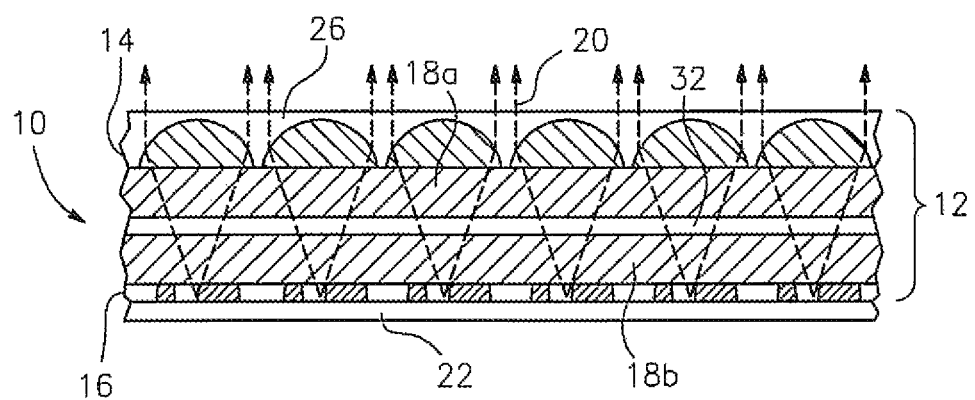
FIG. 6A is similar to FIG. 5A except that the focusing element layer is an embedded layer of convex lenses.

FIGS. 5A, 6A depict embodiments of the tamper indicating security device 10 of the present invention, where the optical film material 12 comprises one focusing element layer 14 (an embedded focusing element layer being shown in FIG. 6A), one icon layer 16, and two optical spacers 18a, 18b, adhered together by a primer or adhesive layer 32, the two optical spacers 18a, 18b, positioned between and adhered to the focusing element layer 14 and the icon layer 16, the film material being adhered or bonded directly to a base material 22 without using an adhesive.

The focusing elements of focusing element layer 14 can be either refractive focusing elements, reflective focusing elements, or hybrid refractive/reflective focusing elements. In one embodiment, as illustrated in the drawings, the focusing elements can be an array of refractive micro-lenses. Examples of suitable focusing elements are disclosed in U.S. Pat. No. 7,333,268 to Steenblik et al., U.S. Pat. No. 7,468,842 to Steenblik et al., and U.S. Pat. No. 7,738,175 to Steenblik et al., all of which, as noted above, are fully incorporated by reference as if fully set forth herein.

As mentioned above, the focusing element layer 14 may be either partially or totally embedded, with partial or total embedment of this layer serving to improve the inventive security device's resistance to optically degrading external effects. In such an embodiment, the refractive index from an outer surface of the inventive device to refracting interfaces is varied between a first and a second refractive index, the first refractive index being substantially or measurably different than the second refractive index. The phrase "substantially or measurably different", as used herein, means a difference in refractive index that causes the focal length(s) of the focusing elements to change at least about 0.1 micron.

The variation of the refractive index may be achieved using a material (hereinafter referred to as "the second material") that either (i) fills interstitial spaces between at least a portion of the focusing elements and/or covers these focusing elements, forming a distinct interface with the material used to form the focusing elements (hereinafter referred to as "the first material"), or (ii) diffuses into the first material thereby forming a gradient interface with the first material. The second material may either partially or totally embed the focusing element layer or may encapsulate the inventive device. More preferably, the second material either forms an outer boundary of the focusing element layer (total embedment of the focusing element layer), or forms an outer boundary of both the focusing element and icon layers (total encapsulation of the tamper indicating security device).

The second material may be transparent, translucent, tinted, or pigmented and may provide additional functionality for security and authentication purposes, including support of automated currency authentication, verification, tracking, counting and detection systems, that rely on optical effects, electrical conductivity or electrical capacitance, magnetic field detection. Suitable materials can include adhesives, gels, glues, lacquers, liquids, molded polymers, and polymers or other materials containing organic or metallic dispersions.

The icons of icon layer 16 can be either positive or negative icon elements. Further the icon elements can be formed using a number of different techniques. For example, the icon elements can be formed by thermoforming, casting, compression molding, injection molding, embossing, patterned radiation exposure and development, laser exposure and development, ink-jet printing, electro printing, printing, engraving, electroforming, photographic, holographic, and laser exposure of a photosensitive emulsion combined with well-known hardening and etching or swelling processes, masking and deposition processes, masking and chemical etching, masking and reactive ion etching, masking and ion beam milling, micromachining, laser machining and laser ablation, photopolymer exposure and development, and other suitable means and combinations thereof. In one embodiment, the icon elements are microstructures in the form of voids or recesses in a polymeric substrate, or their inverse shaped posts, with the voids (or recesses) or regions surrounding the shaped posts optionally filled with a contrasting substance such as dyes, coloring agents, pigments, powdered materials, inks, powdered minerals, metal materials and particles, magnetic materials and particles, magnetized materials and particles, magnetically reactive materials and particles, phosphors, liquid crystals, liquid crystal polymers, carbon black or other light absorbing materials, titanium dioxide or other light scattering materials, photonic crystals, non-linear crystals, nanoparticles, nanotubes, buckeyballs, buckeytubes, organic materials, pearlescent materials, powdered pearls, multilayer interference materials, opalescent materials, iridescent materials, low refractive index materials or powders, high refractive index materials or powders, diamond powder, structural color materials, polarizing materials, polarization rotating materials, fluorescent materials, phosphorescent materials, thermochromic materials, piezochromic materials, photochromic materials, tribolumenscent materials, electroluminescent materials, electrochromic materials, magnetochromic materials and particles, radioactive materials, radioactivatable materials, electret charge separation materials, and combinations thereof. Examples of suitable icon elements are also disclosed in U.S. Pat. No. 7,333,268 to Steenblik et al., U.S. Pat. No. 7,468,842 to Steenblik et al., and U.S. Pat. No. 7,738,175 to Steenblik et al., all of which, as noted above, are fully incorporated by reference as if fully set forth herein.

Optical spacer or spacer layer 18 is included between focusing element layer 14 and icon layer 16. In one such embodiment, optical spacer or spacer layer 18 is bonded to or formed as a part of the focusing element layer 14, or the icon layer 16. In another embodiment, the thickness of the focusing element layer 14 is increased to allow the focusing elements to be free standing. In yet another embodiment, an optical spacer or spacer layer 18a is bonded to another optical spacer or spacer layer 18b. In these embodiments, interlayer failure can be designed to occur, for example, between the optical spacer or spacer layer 18 and the icon layer 16, between the focusing element layer 14 and the optical spacer or spacer layer 18, between the optical spacer or spacer layers 18a, 18b, or between the optical spacer or spacer layer 18 containing the focusing elements on one side and the optical spacer or spacer layer containing the icon elements on the opposing side.

Optical spacer or spacer layer 18 may be formed using one or more essentially transparent or translucent polymers including, but not limited to, polycarbonate, polyester, polyethylene, polyethylene napthalate, polyethylene terephthalate, polypropylene, polyvinylidene chloride, and the like. In an exemplary embodiment, the optical spacer or spacer layer(s) 18 is formed using polyester or polyethylene terephthalate.

The tamper indicating security device 10 of the present invention may further comprise additional features, such as those described in U.S. Pat. No. 7,333,268 to Steenblik et al., U.S. Pat. No. 7,468,842 to Steenblik et al., and U.S. Pat. No. 7,738,175 to Steenblik et al., all of which, as noted above, are fully incorporated herein by reference as if fully set forth herein. For example, and as noted above, security device 10 may optionally further comprise one or more layers such as print layers, metalized or partially metalized layers, primer or adhesive layers, sealing or coating layers, and stiffening layers. In one such embodiment, security device 10 further comprises a sealing or coating layer applied to a side of the icon layer(s) for protecting this layer(s). The sealing or coating layer may be transparent, translucent, tinted, pigmented, opaque, metallic, magnetic, optically variable, or any combination of these that provide desirable optical effects and/or additional functionality for security and authentication purposes, including support of automated currency authentication, verification, tracking, counting and detection systems, that rely on optical effects, electrical conductivity or electrical capacitance, magnetic field detection. Suitable sealing or coating layer materials can include any of the radiation curable resins listed below, plus many different commercially available paints, inks, overcoats, varnishes, lacquers, and clear coats used in the printing and paper and film converting industries.

In one embodiment, security device 10 is prepared substantially in accordance with the process or processes described in U.S. Pat. No. 7,333,268 to Steenblik et al., U.S. Pat. No. 7,468,842 to Steenblik et al., U.S. Pat. No. 7,738,175 to Steenblik et al. For example, security device 10 may be prepared by: (a) applying a substantially transparent or clear radiation curable resin to the upper and lower surfaces of the optical spacer or spacer layer 18; (b) forming a microlens array on the upper surface and an icon array in the form of microstructures, for example, recesses and/or shaped posts, on the lower surface of the optical spacer 18; (c) curing the substantially transparent or clear resin using a source of radiation; (d) filling the icon array recesses and/or areas surrounding the shaped posts with a pigmented resin or ink; and (e) removing excess resin or ink from the lower surface of the optical spacer 18.

Suitable radiation curable resins include, but are not limited to, acrylics, epoxies, polyesters, acrylated polyesters, polypropylenes, urethanes, acrylated urethanes, and the like. Preferably, the arrays are formed using an acrylated urethane, which is available from Lord Chemicals.

As noted above, security device 10 may be used for authentication of currency or banknotes, secure documents (e.g., identification (ID) cards) and consumer goods. Generally speaking, security device 10 may be adhered to any base material that requires a security device, including, but not limited to, materials such as plastics, polymer films (e.g., acrylic, cellophane, polycarbonate, polyester, polyethylene, polypropylene, polyvinyl, polyvinylidene chloride, nylon), leathers, metals, glass, wood, paper or paper-like material, cloth, and the like.

In one contemplated embodiment, security device 10 is adhered or bonded to a passport paper.

As noted above, security device 10 may be adhered or bonded to an underlying base material 22 with or without the use of an adhesive. Bonding without the use of an adhesive may be achieved using, for example, thermal welding techniques such as ultrasonic welding, vibration welding, and laser fusing. Adhesives for adhering device 10 to a base material 22 may be one of hot melt adhesives, heat activatable adhesives, pressure sensitive adhesives, and polymeric laminating films. These adhesives are preferably crosslinkable in nature, such as ultraviolet (UV) cured acrylic or epoxy, with crosslinking achieved while the adhesive is in the melt phase, or upon cooling.

Interlayer failure between the optical spacer or spacer layer 18 and the icon layer 16 of optical film material 12 is shown in FIGS. 1B, 2C, 3C and 4C, as an attempt is made to detach device 10 from base material 22. The sought-after interlayer failure or delamination shown in these drawings may be achieved by:

(1) increasing or decreasing the stiffness (Young's modulus or tensile modulus), bond strength, or crosslink density of the icon layer 16;

(2) incorporating stress inducing (e.g., volume changing) components into either the icon layer formulation or a sealing or coating layer formulation applied to a side of the icon layer 16; and/or (3) introducing a bond weakening or sacrificial layer at an interface between the optical spacer or spacer layer 18 and the icon layer 16.

Figure 2B:
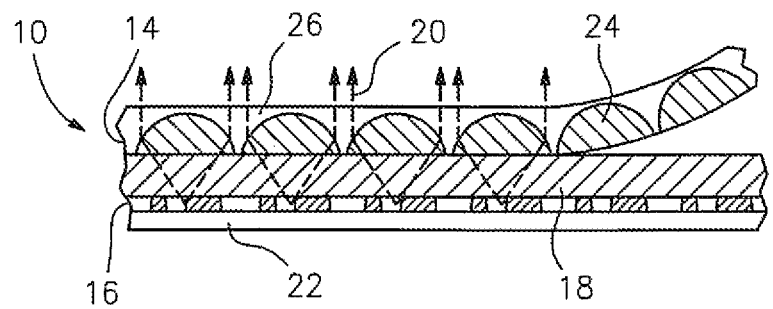
Figure 2C:
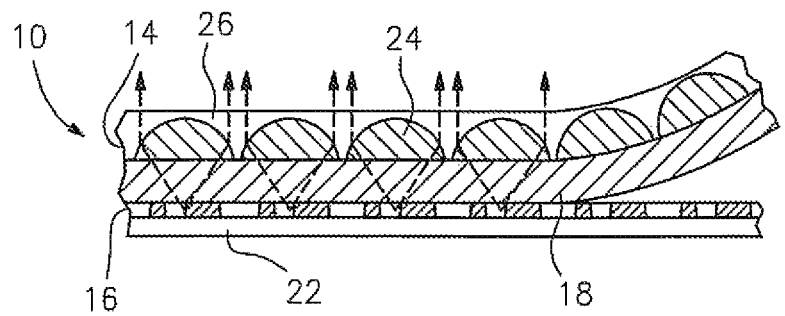
FIG. 2C shows interlayer failure between the optical spacer and icon layer.
Figure 3B:
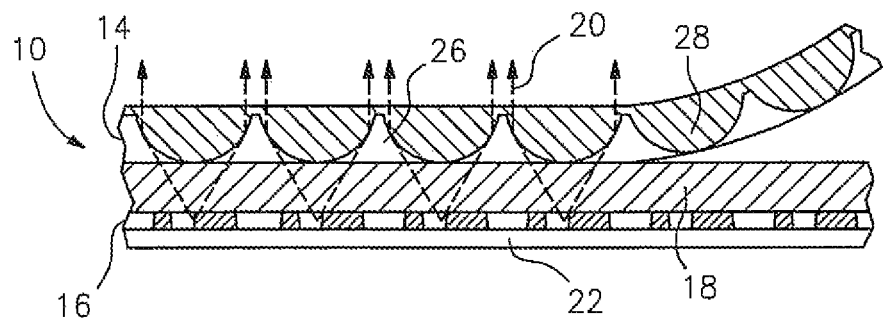
Figure 3C:
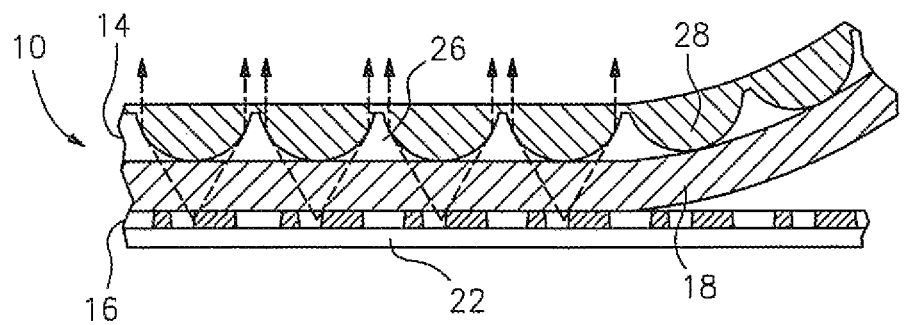
FIG. 3C shows interlayer failure between the optical spacer and icon layer.
Figure 4B:
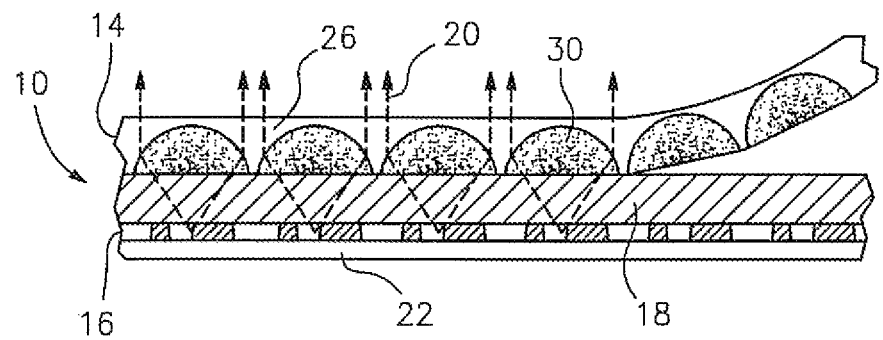
Figure 4C:
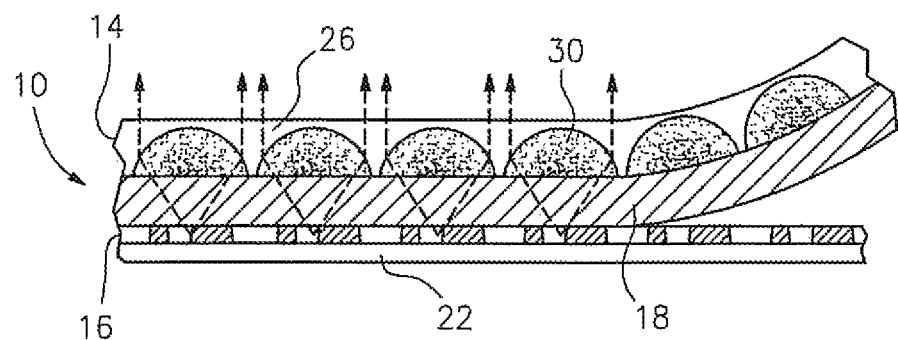
FIG. 4C shows interlayer failure between the optical spacer and icon layer.

In FIGS. 2B, 3B and 4B, interlayer failure between focusing element layer 14 and optical spacer 18 is shown. Such interlayer failure or delamination may be achieved by increasing or decreasing the stiffness, bond strength, or crosslink density of the focusing element layer 14, incorporating stress inducing components into this layer, and/or introducing a bond weakening layer at the interface between layer 14 and optical spacer 18. As will be readily apparent to those skilled in the art, interlayer failure in FIG. 1B could also have been designed to occur between the focusing element layer 14 and the optical spacer 18.

Figure 5B:
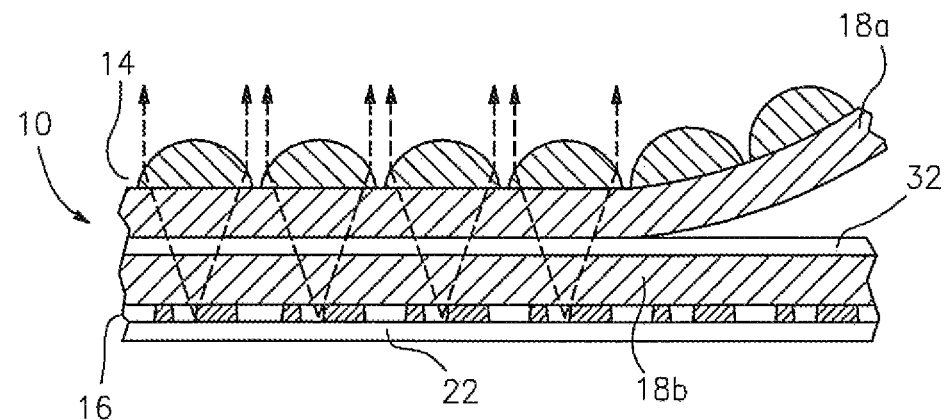
FIG. 5B shows interlayer failure between one optical spacer and the primer or adhesive layer of the tamper indicating security device shown in FIG. 5A.
Figure 6B:
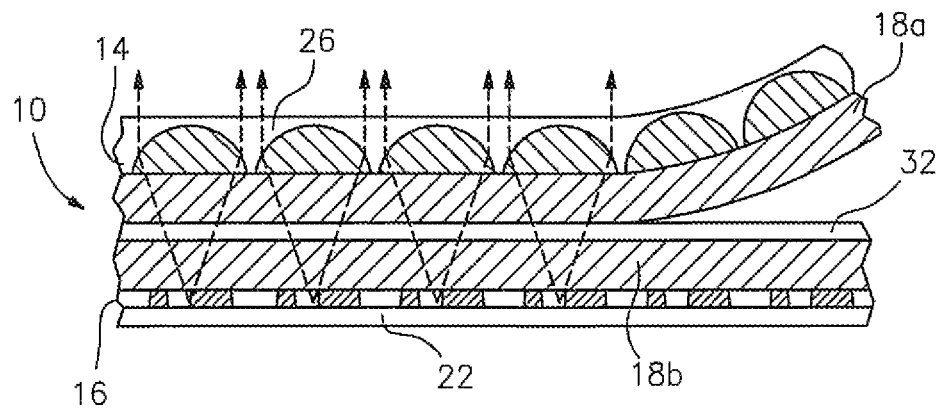
FIG. 6B shows interlayer failure between one optical spacer and the primer or adhesive layer of the tamper indicating security device shown in FIG. 6A.

In FIGS. 5B and 6B, interlayer failure between one optical spacer 18a and a primer or adhesive layer 32 is shown. Such interlayer failure or delamination may be achieved by formulating the primer or adhesive layer 32 so as to reduce its interlayer bond strength so that applied or induced stress is propagated along this plane by, for example, decreasing its stiffness or crosslink density, or by incorporating stress inducing components into the formulation used to prepare this layer.

As noted above, interlayer failure or delamination may also be achieved by increasing or decreasing the stiffness, bond strength, or crosslink density of the icon layer 16. Increasing the stiffness and crosslink density of the icon layer 16 may be achieved by, for example, (1) increasing exposure of either the entire security device 10 or just the icon layer 16 to radiation (e.g., UV or electron beam radiation) during manufacture, or (2) increasing exposure of either the entire security device 10 or just the icon layer 16 to radiation once device 10 is in place on base material 22.

In one such contemplated embodiment, interlayer failure is achieved by increasing the time during which the entire film material 12 or device 10 is exposed to radiation. The focusing element and icon layers 14, 16, are usually crosslinkable thermoset layers, while optical spacer 18 is a thermoplastic layer. Increased radiation exposure times will serve to increase the level of crosslinking in these layers to some degree and thus the level of stiffness or Young's modulus (ASTM D747-10, D882-10, or D2240-05 (2010)) and cohesive strength. Interlayer failure will occur between the optical spacer or spacer layer 18 and relatively rigid icon layer 16 because the icon layer resists flexing while the focusing element layer 14 is able to flex along with the optical spacer during applied or induced stress (e.g., pressure, flexing, shrinkage). In particular, stress applied to/induced within film material 12 does not propagate from focusing element to focusing element because of interstitial gaps between the focusing elements which form stress relieving areas. The icon layer 16, which is usually a continuous or nearly continuous layer, does propagate stresses into adjacent icon areas thereby increasing the tendency for separation and bond breaking between this layer and a contiguous layer. Increased radiation exposure times do not serve to alter the stiffness of the optical spacer, so it retains flexibility relative to the icon layer, increasing the tendency for separation between the layers.

Preferably, interlayer failure is achieved by increasing radiation exposure times for just the icon layer 16. As will be evident to those skilled in the art, selectively increasing exposure of the icon layer 16 to radiation will advantageously prevent degradation or alteration of focusing element layer 14 thereby preserving this layer's good wear and abrasion resistance. In this preferred embodiment, the stiffness or Young's modulus of the icon layer 16 is greater than the stiffness or Young's modulus of the focusing element layer 14.

For the reasons stated above, increasing the stiffness and crosslink density of focusing element layer 14 is preferably achieved by increasing radiation times for just the focusing element layer 14, while avoiding degradation of the other layers.

Figure 7:
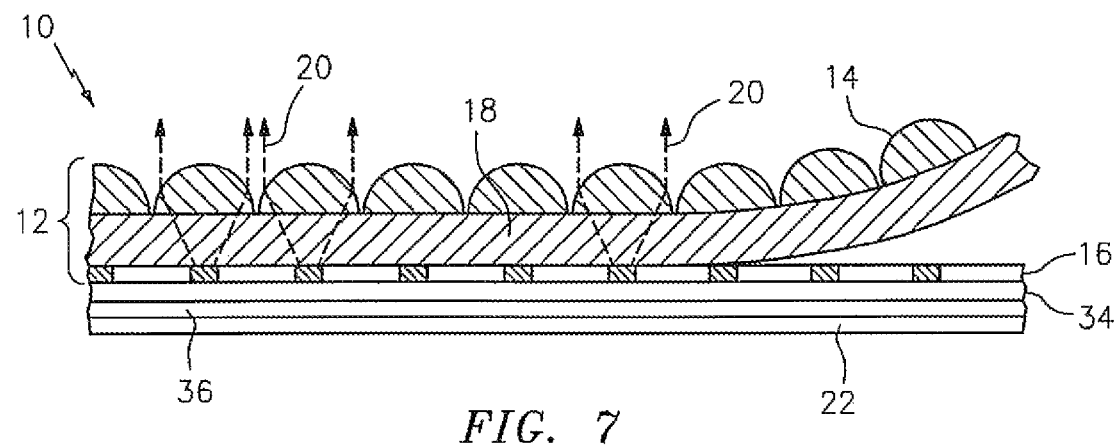
FIG. 7 is a cross-sectional side view of another embodiment of the inventive tamper indicating security device, where the optical film material comprises one focusing element layer, one icon layer, an optical spacer positioned between and adhered to the focusing element layer and the icon layer, a stiffening layer applied to the underside of the icon layer to promote failure between the optical spacer and the icon layer, and an adhesive layer, the adhesive layer serving to adhere or bond the film material to a base material.

As best shown in FIG. 7, increasing the stiffness of icon layer 16 may also be achieved by applying a relatively stiff backing or stiffening layer 34 to this layer. Here, the security device is adhered or bonded to base material 22 using an adhesive 36. Suitable stiffening layers may be prepared from multifunctional monomers and oligomers including, but not limited to, multifunctional acrylate monomers and oligomers such as polyester tetraacrylate (tensile strength: 6000 psi), bisphenol A epoxy diacrylate (tensile strength: 13,900 psi) and dipropylene glycol diacrylate (tensile strength: 9,100 psi), which are available from Sartomer USA, LLC, 502 Thomas Jones Way, Exton, Pa. 19341, with relative stiffness being controlled by the degree of crosslink density in layer 34. In this embodiment, interlayer failure occurs between optical spacer 18 and icon layer 16 of optical film material 12.

Interlayer failure may also be achieved by incorporating stress inducing (e.g., volume changing) components into the formulation used to prepare the target layer (e.g., icon layer 16, or a sealing or coating layer formulation applied to a side of the icon layer 16). Stress inducing components include, but are not limited to, those components that shrink or evolve gas upon curing (e.g., expanding polyurethane foams), those components that swell when exposed to certain liquids or gases, those components that undergo a phase change or phase separation (e.g., an amorphous polymer that undergoes a phase change to become polycrystalline or crystalline) with a change in temperature. When incorporated into the formulation used to prepare, for example, the icon layer 16, the stress inducing components cause intrinsic stress in the layer, thereby weakening the bond between the icon layer 16 and a contiguous layer. When incorporated into the formulation used to prepare the sealing or coating layer formulation, the intrinsically stressed sealing or coating layer will exert a force on the icon layer 16, which serves to likewise weaken the bond between the icon layer 16 and a contiguous layer.

The described intralayer failure may also be achieved by introducing a uniform or patterned bond weakening or sacrificial layer (e.g., lacquer or other material having a relatively low cohesive strength such as metal including vapor deposited or sputtered metal, or dielectric materials) at an interface between the focusing element layer 14 and the icon layer 16. Suitable bond weakening or sacrificial layers are prepared using materials having relatively low cohesive strength (i.e., materials where stress causing tensile fracture (without plastic deformation) is relatively low) and include, but are not limited to, lacquers, metal layers (e.g., vapor deposited or sputtered metal layers) and dielectric coatings.

Figure 8:
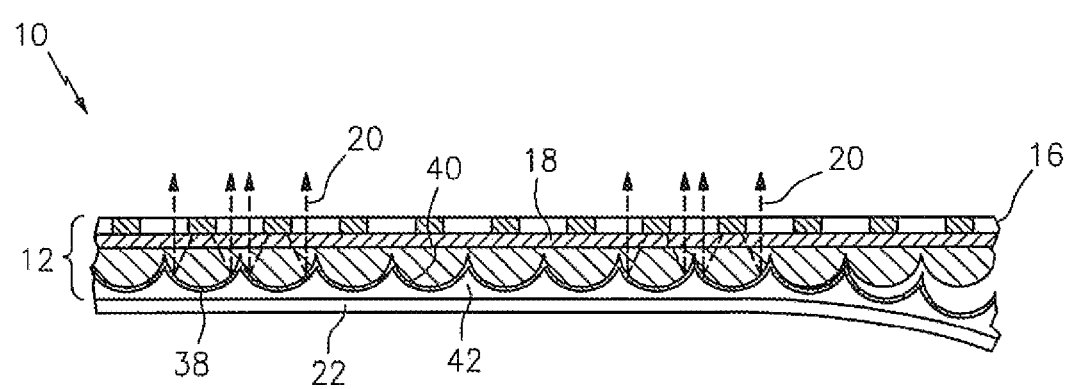
FIG. 8 is a cross-sectional side view of yet another embodiment of the tamper indicating security device of the present invention, where the optical film material comprises a layer of metalized focusing reflectors (instead of refractive lenses), an icon layer, an optical spacer or spacer layer located between the focusing reflector layer and the icon layer, and an adhesive layer, which embeds the focusing reflector layer and as noted above serves to adhere or bond the film material to a base material.

For non-refractive embodiments employing focusing reflectors, interlayer failure may be achieved, as best shown in FIG. 8, by applying a uniform or patterned metal layer 38 to the focusing reflector surface 40. Here, the metal layer 38 serves to improve focusing efficiency while allowing for interlayer failure when an attempt is made to detach device 10 from the underlying base material 22. In this embodiment, adhesive material 42 fills interstitial spaces between and covers the focusing reflectors. As will be readily apparent from the present disclosure, interlayer failure of the device shown in FIG. 8 may also be designed to occur between the icon layer 16 and the optical spacer 18, or between the optical spacer 18 and the layer of focusing reflectors 40.

As mentioned above, the described interlayer failure can also be designed to occur between other layers of the system. For example, one or more additional focusing element layers can be included, as well as one or more additional icon layers. Where one or more additional focusing element layers and/or icon layers are included, one or more additional synthetic images can be formed. When two different synthetic images are formed, the interlayer failure described herein can be designed to occur between layers such that the formation of one, but not the other, of the two synthetic images is disrupted.

As evident from the above description, the present invention fulfills its security and tamper indicating functions without requiring major production system changes and/or major fabrication step changes other than, for example, formulation and curing dosage changes. Moreover, while the inventive device may be adhered to any base material that requires a security device, this invention is particularly advantageous when used with, for example, identification documents such as passport papers. Security, particularly at major airports has become a significant concern. No printable identification is currently available to positively identify a passenger with high reliability and tamper resistance. The present invention serves to increase the level of reliability of passport papers by providing the paper with clear and unmistakable tamper indicating properties.

While various embodiments of the present invention have been described above, it should be understood that they have been presented by way of example only, and not limitation. Thus, the breadth and scope of the present invention should not be limited by any of the exemplary embodiments.

We claim:

1. A tamper indicating security device which comprises an optical film material that is made up of at least one layer containing focusing elements and at least one layer containing microstructured image elements, the focusing element and image element layers configured such that when the at least one layer containing image elements is viewed through the at least one layer containing focusing elements, one or more synthetic images are produced, the device being adhered or bonded to a base material, wherein the device separates between layers or within a layer when an attempt is made to detach the device from the base material, rendering the device partially or totally inoperable,
wherein the microstructured image elements are in the form of: (a) voids or recesses in a polymeric substrate; (b) raised areas or shaped posts; or (c) a combination of (a) and (b).

2. The tamper indicating security device of claim 1, wherein when an attempt is made to detach the device from the base material, the device no longer operates to produce one or more synthetic images.

3. The tamper indicating security device of claim 1, wherein when an attempt is made to detach the device from the base material, the device produces a reduced number of synthetic images.

4. The tamper indicating security device of claim 1, wherein at least one optical spacer or spacer layer is positioned between the at least one focusing element layer and the at least one image element layer of the optical film material, wherein the focusing elements form one or more synthetic images of at least a portion of the image elements, wherein the security device separates or delaminates within a target layer and/or at a target interface within the security device when an attempt is made to detach the device from the base material.

5. The tamper indicating security device of claim 4, wherein (a) the cohesive strength of the target layer in the security device is less than the cohesive strength of the other layers in the security device, and/or (b) the bond strength of the target interface in the security device is less than the bond strengths of interfaces between the other layers in the security device and between the security device and the base material.

6. The tamper indicating security device of claim 1, wherein the optical film material further comprises at least one optical spacer or spacer layer positioned between the at least one focusing element layer and the at least one image element layer, and one or more layers selected from the group of bond weakening layers and primer or adhesive layers, the at least one focusing element layer being disposed a substantially uniform distance from the at least one image element layer, with the focusing elements forming one or more synthetic images of at least a portion of the image elements.

7. The tamper indicating security device of claim 6, wherein the at least one layer containing focusing elements is a partially or totally embedded layer.

8. The tamper indicating security device of claim 7, wherein the focusing elements of the optical film material are refractive focusing elements having a focal length, the optical film material having a refractive index from an outer surface to refracting interfaces that is varied between a first and a second refractive index, the first refractive index being substantially or measurably different than the second refractive index.

9. The tamper indicating security device of claim 8, wherein the difference between the first refractive index and the second refractive index causes a change of at least about 0.1 micron in the focal length of the focusing elements.

10. The tamper indicating security device of claim 7, wherein the at least one focusing element layer is formed from a first material having a refractive index, wherein the optical film material further comprises a second material having a different refractive index that fills interstitial spaces between and/or covers the focusing elements, a distinct interface being formed between the first and second materials.

11. The tamper indicating security device of claim 10, wherein the second material totally embeds the at least one focusing element layer.

12. The tamper indicating security device of claim 11, wherein the second material forms an outer boundary or layer of the at least one image element layer, thereby also totally embedding this layer.

13. The tamper indicating security device of claim 7, wherein the at least one focusing element layer is formed from a first material having a refractive index and a second material having a different refractive index, the second material diffusing into the first material thereby forming a gradient interface with the first material.

14. The tamper indicating security device of claim 6, wherein the focusing elements are selected from the group of refractive focusing elements, reflective focusing elements and hybrid refractive/reflective focusing elements.

15. The tamper indicating security device of claim 14, wherein the focusing elements are refractive focusing elements.

16. The tamper indicating security device of claim 6, wherein the at least one layer containing image elements comprises stress inducing components.

17. The tamper indicating security device of claim 6, wherein the optical film material comprises one optical spacer or spacer layer located between and adhered to the at least one focusing element layer and the at least one image element layer.

18. The tamper indicating security device of claim 17, wherein the optical spacer or spacer layer is formed using one or more essentially transparent or translucent polymers selected from the group of polycarbonate, polyester, polyethylene, polyethylene napthalate, polyethylene terephthalate, polypropylene and polyvinylidene chloride.

19. The tamper indicating security device of claim 6, which further comprises one or more sealing or coating layers.

20. The tamper indicating security device of claim 19, wherein the one or more sealing or coating layers is applied to the at least one image element layer of the optical film material opposite the at least one focusing element layer, the one or more sealing or coating layers having at least a portion that is transparent, translucent, tinted, pigmented, opaque metallic, magnetic or optically variable.

21. The tamper indicating security device of claim 20, wherein the at least one sealing or coating layer is prepared using a radiation curable resin selected from the group of acrylics, epoxies, polyesters, acrylated polyesters, polypropylenes, urethanes, acrylated urethanes, and combinations thereof.

22. The tamper indicating security device of claim 19, wherein the one or more sealing or coating layers comprises stress inducing components.

23. The tamper indicating security device of claim 6, wherein one or more primer or adhesive layers form part of the optical film material and/or are applied to one or opposing sides of the security device.

24. The tamper indicating security device of claim 23, wherein the one or more primer or adhesive layers is prepared using a material selected from the group of hot melt adhesives, heat activatable adhesives, pressure sensitive adhesives, and polymeric laminating films.

25. The tamper indicating security device of claim 24, wherein the one or more primer or adhesive layers is formed using a cured acrylic material.

26. The tamper indicating security device of claim 24, wherein the one or more primer or adhesive layers is formed using a cured epoxy material.

27. The tamper indicating security device of claim 6, which is in the form of a security strip, thread, patch, inlay, or overlay.

28. The tamper indicating security device of claim 6, wherein the base material is selected from the group of currency, banknotes, bonds, checks, travelers checks, identification cards, lottery tickets, passports, postage stamps, stock certificates, stationery items, labels, consumer goods, and bags or packaging used with consumer goods.

29. The tamper indicating security device of claim 28, wherein the base material is a banknote.

30. The tamper indicating security device of claim 28, wherein the base material is a passport.

31. A sheet material having opposing surfaces and comprising at least one tamper indicating security device of claim 6 mounted on a surface of, or at least partially embedded within, the sheet material.

32. A document made from the sheet material of claim 31.

33. The tamper indicating security device of claim 6, wherein the optical film material further comprises one or more layers selected from the group of print layers, partially or totally metalized layers, primer or adhesive layers, sealing or coating layers and stiffening layers.

34. A sheet material having opposing surfaces and comprising at least one tamper indicating security device of claim 1 mounted on a surface of, or at least partially embedded within, the sheet material.

35. A document made from the sheet material of claim 34.

36. The document of claim 35, which is selected from the group of banknotes, passports, identification cards, credit cards, and labels.

37. The document of claim 36, which comprises a banknote.

38. The document of claim 36, which comprises a passport.

39. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates between layers or within a layer when an attempt is made to detach the device from the base material, rendering the device partially or totally inoperable,
wherein the focusing elements are reflective focusing elements or focusing reflectors,
wherein the image elements are in the form of: (a) voids or recesses in a polymeric substrate; (b) raised areas or shaped posts; or (c) a combination of (a) and (b).

40. The tamper indicating security device of claim 39, wherein the focusing reflectors are metalized focusing reflectors.

41. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates between layers or within a layer when an attempt is made to detach the device from the base material, rendering the device partially or totally inoperable,
wherein the focusing elements are hybrid refractive/reflective focusing elements,
wherein the image elements are in the form of: (a) voids or recesses in a polymeric substrate; (b) raised areas or shaped posts; or (c) a combination of (a) and (b).

42. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates or delaminates when an attempt is made to detach the device from the base material, rendering the device partially or totally inoperable, wherein the image elements are microstructures in the form of voids or recesses in a polymeric substrate.

43. The tamper indicating security device of claim 42, wherein the voids or recesses are filled with a contrasting substance selected from the group of dyes, coloring agents, pigments, powdered materials, inks, powdered minerals, metal materials and particles, magnetic materials and particles, magnetized materials and particles, magnetically reactive materials and particles, phosphors, liquid crystals, liquid crystal polymers, carbon black or other light absorbing materials, titanium dioxide or other light scattering materials, photonic crystals, non-linear crystals, nanoparticles, nanotubes, buckeyballs, buckeytubes, organic materials, pearlescent materials, powdered pearls, multilayer interference materials, opalescent materials, iridescent materials, low refractive index materials or powders, high refractive index materials or powders, diamond powder, structural color materials, polarizing materials, polarization rotating materials, fluorescent materials, phosphorescent materials, thermochromic materials, piezochromic materials, photochromic materials, tribolumenscent materials, electroluminescent materials, electrochromic materials, magnetochromic materials and particles, radioactive materials, radioactivatable materials and electret charge separation materials.

44. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates or delaminates when an attempt is made to detach the device from the base material, rendering the device partially or totally inoperable, wherein the image elements are microstructures in the form of raised areas or shaped posts.

45. The tamper indicating security device of claim 44, wherein the regions surrounding the raised areas or shaped posts are filled with a contrasting substance selected from the group of dyes, coloring agents, pigments, powdered materials, inks, powdered minerals, metal materials and particles, magnetic materials and particles, magnetized materials and particles, magnetically reactive materials and particles, phosphors, liquid crystals, liquid crystal polymers, carbon black or other light absorbing materials, titanium dioxide or other light scattering materials, photonic crystals, non-linear crystals, nanoparticles, nanotubes, buckeyballs, buckeytubes, organic materials, pearlescent materials, powdered pearls, multilayer interference materials, opalescent materials, iridescent materials, low refractive index materials or powders, high refractive index materials or powders, diamond powder, structural color materials, polarizing materials, polarization rotating materials, fluorescent materials, phosphorescent materials, thermochromic materials, piezochromic materials, photochromic materials, tribolumenscent materials, electroluminescent materials, electrochromic materials, magnetochromic materials and particles, radioactive materials, radioactivatable materials and electret charge separation materials.

46. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates or delaminates when an attempt is made to detach the device from the base material, rendering the device partially or totally inoperable, wherein the optical film material comprises two or more focusing element layers that form two or more synthetic images, wherein when an attempt is made to detach the device from the base material, the device produces a reduced number of synthetic images.

47. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates or delaminates when an attempt is made to detach the device from the base material, rendering the device partially or totally inoperable, wherein the optical film material comprises two or more image element layers, the focusing elements forming two or more synthetic images, wherein when an attempt is made to detach the device from the base material, the device produces a reduced number of synthetic images.

48. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates or delaminates when an attempt is made to detach the device from the base material, rendering the device partially or totally inoperable, wherein the optical film material comprises one optical spacer or spacer layer located between and adhered to the at least one focusing element layer and the at least one image element layer, wherein separation or delamination of the security device occurs between the at least one focusing element layer and the optical spacer or spacer layer of the optical film material when an attempt is made to detach the device from the base material.

49. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates or delaminates when an attempt is made to detach the device from the base material, rendering the device partially or totally inoperable, wherein the optical film material comprises one optical spacer or spacer layer located between and adhered to the at least one focusing element layer and the at least one image element layer, wherein separation or delamination of the security device occurs between the optical spacer or spacer layer and the at least one image element layer of the optical film material when an attempt is made to detach the device from the base material.

50. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates between layers or within a layer when an attempt is made to detach the device from the base material, rendering the device partially or totally inoperable, wherein the optical film material comprises two optical spacer or spacer layers that are adhered together by a primer or adhesive layer, the two optical spacer or spacer layers located between and adhered to the at least one focusing element layer and the at least one image element layer, wherein the image elements are in the form of: (a) voids or recesses in a polymeric substrate; (b) raised areas or shaped posts; or (c) a combination of (a) and (b).

51. The tamper indicating security device of claim 50, wherein the two optical spacer or spacer layers are formed using one or more essentially transparent or translucent polymers selected from the group of polycarbonate, polyester, polyethylene, polyethylene napthalate, polyethylene terephthalate, polypropylene and polyvinylidene chloride.

52. The tamper indicating security device of claim 50, wherein the primer or adhesive layer is formed using one or more adhesives selected from the group of hot melt adhesives, heat activatable adhesives, pressure sensitive adhesives, and polymeric laminating films.

53. The tamper indicating security device of claim 52, wherein the primer or adhesive layer is formed using a cured acrylic material.

54. The tamper indicating security device of claim 52, wherein the primer or adhesive layer is formed using a cured epoxy material.

55. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates or delaminates when an attempt is made to detach the device from the base material, rendering the device partially or totally inoperable, wherein the optical film material comprises two optical spacer or spacer layers that are adhered together by a primer or adhesive layer, the two optical spacer or spacer layers located between and adhered to the at least one focusing element layer and the at least one image element layer, wherein separation or delamination of the security device occurs between one optical spacer or spacer layer and the primer or adhesive layer of the optical film material when an attempt is made to detach the device from the base material.

56. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates or delaminates when an attempt is made to detach the device from the base material, rendering the device partially or totally inoperable, wherein the optical film material further comprises one or more bond weakening layers located between and adhered to at least one of the at least one focusing element layer and the at least one image element layer.

57. The tamper indicating security device of claim 56, wherein the one or more bond weakening layers is a uniform bond weakening layer.

58. The tamper indicating security device of claim 56, wherein the one or more bond weakening layers is a patterned bond weakening layer.

59. The tamper indicating security device of claim 56, wherein the one or more bond weakening layers is a metal layer.

60. The tamper indicating security device of claim 59, wherein the metal layer is a vapor deposited metal layer.

61. The tamper indicating security device of claim 56, wherein the one or more bond weakening layers is a dielectric coating.

62. The tamper indicating security device of claim 56, wherein intralayer failure is designed to occur within the one or more bond weakening layer.

63. The tamper indicating security device of claim 56, wherein interlayer failure is designed to occur between the one or more bond weakening layers and a contiguous layer.

64. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates between layers or within a layer when an attempt is made to detach the device from the base material, rendering the device partially or totally inoperable, wherein the focusing elements are reflective focusing elements or focusing reflectors, and wherein the security device further comprises a reflective layer located on the focusing reflectors, wherein the image elements are in the form of: (a) voids or recesses in a polymeric substrate; (b) raised areas or shaped posts; or (c) a combination of (a) and (b).

65. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates or delaminates when an attempt is made to detach the device from the base material, rendering the device partially or totally inoperable, wherein the focusing elements are reflective focusing elements or focusing reflectors, and wherein the security device further comprises a reflective layer located on the focusing reflectors, wherein interlayer failure is designed to occur between the reflective layer and the focusing reflectors.

66. A tamper indicating security device, which comprises an optical film material that is made up of at least one layer containing focusing elements, at least one layer containing image elements, at least one optical spacer or spacer layer positioned between the at least one focusing element layer and the at least one image element layer, the at least one focusing element layer being disposed a substantially uniform distance from the at least one image element layer, with the focusing elements forming one or more synthetic images of at least a portion of the image elements, the device being adhered or bonded to a base material, wherein the device separates or delaminates when an attempt is made to detach the device from the base material, rendering the device partially or totally inoperable, which further comprises one or more stiffening layers applied to the one or more image element layers of the optical film material.

67. The tamper indicating security device of claim 66, wherein the one or more stiffening layers is prepared using a multifunctional acrylate monomer or oligomer selected from the group of polyester tetraacrylate, bisphenol A epoxy diacrylate, dipropylene glycol diacrylate, and combinations thereof.

68. The tamper indicating security device of claim 66, wherein interlayer failure is designed to occur between the optical spacer or spacer layer and the at least one image element layer.

69. A method for revealing or indicating tampering with a security device adhered or bonded to a base material when an attempt is made to detach the device from the base material, wherein the security device comprises an optical film material that is made up of at least one layer containing focusing elements, at least one layer containing microstructured image elements, and at least one optical spacer or spacer layer positioned between the at least one focusing element layer and the at least one image element layer, the at least one focusing element layer being disposed a substantially uniform distance from the at least one image element layer, the focusing elements forming one or more synthetic images of at least a portion of the image elements, the method comprising increasing the ability of one or more layers in the optical film material to concentrate applied or induced stress such that when an attempt is made to detach the security device from the base material, the one or more layers will separate between layers or within a layer, rendering the security device partially or totally inoperable, thereby indicating that tampering has occurred, wherein the microstructured image elements are in the form of: (a) voids or recesses in a polymeric substrate; (b) raised areas or shaped posts; or (c) a combination of (a) and (b).

70. A method for causing a security device that is adhered or bonded to a base material to separate between layers or within a layer when an attempt is made to detach the device from the base material, wherein the security device comprises an optical film material that is made up of at least one layer containing focusing elements, at least one layer containing image elements, and at least one optical spacer or spacer layer positioned between the at least one focusing element layer and the at least one image element layer, the at least one focusing element layer being disposed a substantially uniform distance from the at least one image element layer, the focusing elements forming one or more synthetic images of at least a portion of the image elements, wherein the image elements are in the form of: (a) voids or recesses in a polymeric substrate; (b) raised areas or shaded posts; or (c) a combination of (a) and (b), the method comprising one or more of the following steps:

(a) increasing or decreasing the stiffness, bond strength, or crosslink density of one or more layers or interfaces of the security device relative to remaining layers or interfaces of the security device;

(b) incorporating stress inducing components into one or more layers of the security device; and (c) introducing a bond weakening layer at an interface between two layers of the security device.

71. A method for causing a security device that is adhered or bonded to a base material to separate or delaminate when an attempt is made to detach the device from the base material, wherein the security device comprises an optical film material that is made up of at least one layer containing focusing elements, at least one layer containing image elements, and at least one optical spacer or spacer layer positioned between the at least one focusing element layer and the at least one image element layer, the at least one focusing element layer being disposed a substantially uniform distance from the at least one image element layer, the focusing elements forming one or more synthetic images of at least a portion of the image elements, the method comprising one or more of the following steps:

(a) increasing or decreasing the stiffness, bond strength, or crosslink density of one or more layers or interfaces of the security device relative to remaining layers or interfaces of the security device;

(b) incorporating stress inducing components into one or more layers of the security device; and (c) introducing a bond weakening layer at an interface between two layers of the security device, wherein the stiffness and crosslink density of one or more layers of the security device is increased by (a) increasing exposure of either the security device, or one or more layers of the security device to radiation during manufacture, or (b) increasing exposure of either the security device, or one or more layers of the security device to radiation once the device is in place on a base material.

72. A method for causing a security device that is adhered or bonded to a base material to separate or delaminate when an attempt is made to detach the device from the base material, wherein the security device comprises an optical film material that is made up of at least one layer containing focusing elements, at least one layer containing image elements, and at least one optical spacer or spacer layer positioned between the at least one focusing element layer and the at least one image element layer, the at least one focusing element layer being disposed a substantially uniform distance from the at least one image element layer, the focusing elements forming one or more synthetic images of at least a portion of the image elements, the method comprising one or more of the following steps:
  (a) increasing or decreasing the stiffness, bond strength, or crosslink density of one or more layers or interfaces of the security device relative to remaining layers or interfaces of the security device;
  (b) incorporating stress inducing components into one or more layers of the security device; and
  (c) introducing a bond weakening layer at an interface between two layers of the security device,
  wherein stress inducing components are incorporated into the one or more layers of the security device, the stress inducing components being selected from the group of those components that shrink or evolve gas upon curing, those components that swell when exposed to certain liquids or gases, and those components that undergo a phase change or phase separation with a change in temperature.

73. The method of claim 72, wherein the stress inducing component is a component that shrinks or evolves gas upon curing.

74. The method of claim 73, wherein the component that shrinks or evolves gas upon curing is an expanding polyurethane foam.

75. The method of claim 72, wherein the stress inducing component is a component that swells when exposed to certain liquids or gases.

76. The method of claim 72, wherein the stress inducing component is a component that undergoes a phase change or phase separation with a change in temperature.

77. The method of claim 76, wherein the component that undergoes a phase change or phase separation with a change in temperature is an amorphous polymer that undergoes a phase change to become polycrystalline or crystalline.

78. The method of claim 72, wherein stress inducing components are incorporated into the at least one image element layer.

79. The method of claim 72, wherein the security device further comprises one or more sealing or coating layers, wherein stress inducing components are incorporated into the one or more sealing or coating layers.

80. A tamper indicating security device, which comprises an optical film material that is made up of at least one layer containing focusing elements and at least one layer containing microstructured image elements, the focusing element and image element layers configured such that when the at least one layer containing image elements is viewed through the at least one layer containing focusing elements, one or more synthetic images are produced, the device being adhered or bonded to a base material, wherein the device separates or delaminates when an attempt is made to detach the device from the base material, rendering the device partially or totally inoperable,
  wherein the microstructured image elements are in the form of voids or recesses in a polymeric substrate.

81. A tamper indicating security device, which comprises an optical film material that is made up of at least one layer containing focusing elements and at least one layer containing microstructured image elements, the focusing element and image element layers configured such that when the at least one layer containing image elements is viewed through the at least one layer containing focusing elements, one or more synthetic images are produced, the device being adhered or bonded to a base material, wherein the device separates or delaminates when an attempt is made to detach the device from the base material, rendering the device partially or totally inoperable,
  wherein the microstructured image elements are in the form of raised areas or shaped posts.

* * * * *